United States Patent
Schlingloff et al.

(10) Patent No.: US 7,931,970 B2
(45) Date of Patent: Apr. 26, 2011

(54) TWO-COMPONENT POLYURETHANE ADHESIVE FOR GLUING FIBROUS MOLDED PARTS

(75) Inventors: Nicole Schlingloff, Duesseldorf (DE); Dorothee Ursula Bogedain, Bedburg (DE); Michael Gansow, Grevenbroich (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 12/797,008

(22) Filed: Jun. 9, 2010

(65) Prior Publication Data
US 2010/0297427 A1    Nov. 25, 2010

Related U.S. Application Data

(63) Continuation of application No. PCT/EP2008/067988, filed on Dec. 19, 2008.

(30) Foreign Application Priority Data

Dec. 20, 2007   (DE) .......................... 10 2007 062 529

(51) Int. Cl.
*B32B 27/40*    (2006.01)
*C08G 18/10*    (2006.01)

(52) U.S. Cl. ................ 428/423.1; 428/423.7; 428/425.8

(58) Field of Classification Search ................. 428/413, 428/423.7, 425.8, 423.1; 528/60
See application file for complete search history.

(56) References Cited

U.S. PATENT DOCUMENTS

| 4,474,900 | A | 10/1984 | Dominguez |
| 5,973,065 | A | 10/1999 | Thiele et al. |
| 6,833,044 | B2 * | 12/2004 | Imai et al. ................. 156/331.4 |

FOREIGN PATENT DOCUMENTS

| DE | 4114022 | 5/1992 |
| DE | 4442353 | 5/1996 |
| DE | 10244142 | 4/2004 |
| EP | 0794977 | 3/1999 |
| EP | 1153997 | 6/2003 |
| FR | 2863319 | 3/2006 |
| WO | WO 02/066527 | 8/2002 |
| WO | WO 2004/029121 | 4/2004 |

OTHER PUBLICATIONS

Search Report from International Application No. PCT/EP2008/067988 dated Apr. 15, 2009.

* cited by examiner

*Primary Examiner* — Thao T. Tran
(74) *Attorney, Agent, or Firm* — James E. Piotrowski; Steven C. Bauman

(57) ABSTRACT

A two-component polyurethane adhesive comprising a polyol component, which contains 2 to 30 wt. % of at least one polyester diol having a molecular weight greater than 1000 g/mole, 5 to 35 wt. % of at least one 3 to 14 functional polyol, 5 to 35 wt. % hydrophobic polyols, 2 to 65 wt. % further additives or auxiliary agents, wherein the sum is to results as 100%, and a cross-linking component made of polyisocyanates in a NCO/OH ratio of 0.9:1 to 1.5:1, wherein the cross-linked adhesive has a Tg greater than 50%.

13 Claims, No Drawings

TWO-COMPONENT POLYURETHANE ADHESIVE FOR GLUING FIBROUS MOLDED PARTS

This application is a continuation of International Application No. PCT/EP2008/067988, filed Dec. 19, 2008, published on Jul. 2, 2009 under Publication No. WO 2009/080740, which claims the benefit of German Patent Application No. 10 2007 062 529.6 filed Dec. 20, 2007, the contents of each of which are incorporated herein by reference in their entirety.

The invention relates to a two-component adhesive based on polyurethanes which exhibits elevated adhesive strength. This adhesive is furthermore intended also to be capable of gluing substrates with uneven surfaces and of bridging crevices or interspaces with a strong adhesive bond.

WO2004/029121 describes two-component polyurethane adhesives which consist of polyols based on dials and triols and crosslink by means of polyisocyanates. Pigments, such as highly disperse silica, fillers and molecular sieve should furthermore be present. Organic acids with a pKa value of between 2.8 and 4.5 are furthermore present as a component essential to the invention. The addition of highly functional polyols to increase network density is not described. It is moreover known that carboxylic acids in crosslinking isocyanate groups may give rise to increased levels of bubble formation.

WO 2002/066527 describes two-component polyurethane adhesives for derived timber products which contain up to 98% of oleochemical polyols, 1 to 7.5% of a low molecular weight diol with an OH value of between 400 to 2000, and 1 to 7.5% of a tri- to penta-functional polyol, further auxiliary substances and a resin, the adhesive being crosslinkable by means of polyisocyanates.

EP 0794977 describes two-component polyurethane adhesives which consist of polyols, highly disperse silica, fillers and molecular sieve and crosslink by means of polyisocyanates. Diols and triols are used as the polyols.

The above adhesives are described for gluing wood and metal; gluing plastics substrates which must also exhibit elevated mechanical stability even when subjected to thermal loads is not described.

It is likewise known to glue glass fibre reinforced plastics substrates. Since such substrates exhibit elevated mechanical stability, it is desirable for the corresponding adhesives likewise to be capable of withstanding corresponding forces. Examples of such gluing operations are the gluing of fiber-reinforced components for wings or other aircraft attachments, the gluing of fiber-reinforced components in the boat building industry or the gluing of fibre-reinforced components for production of blades for wind power systems. Elevated mechanical demands are placed on the glued components. Elevated tensile forces must be withstood, the loads applied by constant vibration are high and lead to material fatigue. Environmental influences are furthermore severe; stability must be ensured at greatly differing temperatures, as must constant properties at different moisture levels. It is here known to glue such components with two-component epoxy adhesives. These exhibit sufficient strength, but have various processing disadvantages. For instance, elevated curing temperatures are necessary in order to achieve sufficient strength. The substrate surfaces furthermore have to be specially prepared for gluing.

The prior art adhesives have the disadvantage that the glue bonds have inadequate mechanical stability under various weathering and temperature conditions. Moreover they are less suitable for gluing large areas, since the working time before the substrates are joined is not sufficiently long. Furthermore, the adhesives are not suitable for frictionally bridging unevennesses in the glued substrates.

The object of the present invention is accordingly to provide an adhesive which glues plastics substrates to one another without pretreatment, which has a long open time and which ensures stable gluing even of uneven surfaces. The crosslinked adhesive layers should furthermore be insensitive to moisture and differing ambient temperatures and should remain stable in their mechanical properties.

The object of the invention is achieved by a two-component polyurethane adhesive consisting of a polyol component containing 2 to 30 wt. % of at least one polyester diol with a molecular weight of above 1000 g/mol, 5 to 35 wt. % of at least one 3- to 14-functional polyol, 5 to 35 wt. % of hydrophobic polyols, together with 2 to 65 wt. % of further additives or auxiliary substances, the total being intended to amount to 100%, together with an isocyanate component prepared from polyisocyanates of an NCO/OH ratio of 0.9:1 to 1.5:1, the crosslinked adhesive exhibiting a $T_g$ of above 50° C.

The present invention also provides the use of such two-component polyurethane adhesives for gluing fiber-reinforced plastics, in particular fiber-reinforced components for producing blades for wind power systems.

Known moldings made from high strength fiber composite materials are suitable as substrates. These may, for example consist of glass fibers, carbon fibers or aramid fibers which are embedded in a plastics matrix. These fibers may be introduced in the form of mats, woven fabrics, nonwovens or rovings. This plastics matrix may, for example, consist of polyesters or epoxies, which react by means of suitable curing agents and/or crosslinking agents to form a thermosetting polymer. Such fiber-reinforced substrates are known to a person skilled in the art. They are used, for example, in aircraft construction, in boat building or in other components subjected to elevated mechanical loads. One particular area of application for such glued substrates is as blades for wind power rotors. The manufacturing methods for such molded parts are also known.

Such blades are, for example, manufactured in mold cavities and crosslinked. The mold is here frequently constructed as a half mold. The side facing the mold is generally obtained as a smooth, ready-to-use surface, while the other side may and is usually intended to be further processed. As manufacture of the blades continues, two or more of these substrates are glued to one another. The side to be glued is generally the side remote from the mold. The surface should be of a structure such that the substrate parts to be glued are approximately form fitting. The surface provided for gluing may be rough and in itself uneven. Sanding or milling to form an exact mirror-image shape to the counterpart to be glued is not necessary. Pretreatment of the surfaces to be glued is not required when using the adhesive according to the invention. A dust- and grease-free surface is sufficient for application of the adhesive; the use of primers is unnecessary.

Once the parts have been produced in the mold, one known working method involves covering the surfaces on the outer side of the molded parts for crosslinking with a tear-resistant protective woven fabric. This may be completely torn off immediately before subsequent gluing, so providing a suitable surface. It is, however, also possible, roughly to machine such surfaces and to adapt them to the corresponding counterpart. The adhesive according to the invention may then be applied onto the substrate surfaces prepared in this manner and freed from base particles and dust.

The two-component polyurethane adhesive according to the invention is flowable, but may in particular also exhibit thixotropic properties. It consists of a polyol component and an isocyanate component. These are mixed immediately before application. The polyol component must contain various polyfunctional polyols. This is intended to ensure sufficient crosslinking for a mechanical stable glue bond, even on exposure to thermal loads. It must also be ensured by selection of the various polyols that sufficient hydrophobicity of the adhesive is obtained.

A hydrophobic polyol is one component of the polyol component. Suitable polyols are, for example, liquid polyhydroxy compounds with on average two to four hydroxyl groups per molecule. Polycarbonate polyols are, for example, suitable as hydrophobic polyols. These are esters of carbonic acid which are obtained by reacting carbonic acid derivatives, for example phosgene or diphenyl carbonate, with diols. Low molecular weight aliphatic diols are, for example, suitable here. OH-functional polybutadienes, as are for example available under the trade name "Poly-bd", may also be used as hydrophobic polyols for the compositions according to the invention.

The molecular weight of these polyols is generally between 300 and 5000 g/mol, preferably in the range from 500 to 3000 g/mol (number-average molecular weight $M_N$, as may be determined by GPC).

It is, however, also possible to use hydrophobic polyols of oleochemical origin. "Oleochemical polyols" are taken to mean polyols based on natural oils and fats, for example the reaction products of epoxidized fatty substances with mono-, di- or polyfunctional alcohols, or glycerol esters of long-chain fatty acids, which are at least partially substituted with hydroxyl groups. Such polyester polyols may be produced, for example, by complete ring opening of epoxidized triglycerides, in which the ring opening was carried out with retention of the ester bonds. The alcohols which may be used for ring opening of the epoxidized triglycerides include methanol, ethanol, propanol, isopropanol, butanol, hexanol, 2-ethylhexanol, fatty alcohols with 6 to 22 C atoms, cyclohexanol, benzyl alcohol, 1,2-ethanol, 1,2-propanediol, 1,3-propanediol, 1,4-butanediol, 1,6-hexanediol, neopentyl glycol, trimethylolpropane, glycerol, trimethylolethane, pentaerythritol, sorbitol and ether group-containing hydroxyl compounds such as alkyl glycols or oligomeric glycols and oligomeric glycerols.

A further group of oleochemical polyols are ring-opening and transesterification products of epoxidized fatty acid esters of lower alcohols, i.e. of epoxidized fatty acid methyl, ethyl, propyl or butyl esters. Preference is here given to the ring-opening or transesterification products with alcohols of a functionality of 2 to 4, in particular the reaction products with ethylene glycol, propylene glycol, oligomeric ethylene glycols, oligomeric propylene glycols, glycerol, trimethylolpropane or pentaerythritol.

For the purposes of the invention, it is also possible to use oleochemical polyols which are obtainable by the transesterification of di- or polyfunctional alcohols such as for example the addition product of ethylene oxide or propylene oxide onto glycerol with triglycerides, such as for example palm oil, peanut oil, rapeseed oil, cottonseed oil, soy oil, sunflower oil and linseed oil.

Particular preference is given to the use of castor oil and dimer diols as hydrophobic oleochemical polyols together with those polyester polyols which are produced by complete ring opening of epoxidized triglycerides of a fat mixture containing at least in part an olefinically unsaturated fatty acid with one or more alcohols having 1 to 12 C atoms and subsequent partial trans-esterification of the triglyceride derivatives to yield alkyl ester polyols having 1 to 12 C atoms in the alkyl residue. These oleochemical polyols may have hydroxyl values of 50 to 400, preferably of 100 to 300, the molecular weight here being approximately above 500 and below 1500 g/mol.

The functionality of the hydrophobic polyols should on average amount to 2.2 to 4, in particular above 2.4. Mixtures may also be used, it being possible for individual components to contain a different number of OH groups. Such hydrophobic polyols are commercially obtainable.

The quantity of the hydrophobic polyols should be between 5 and 50 wt. %, in particular up to 35 wt. %. The quantity also depends on the strength of the hydrophobicity of the polyols. Relative to the mixture of all the polyols, the intention is to obtain a hydrophobic mixture.

A further essential component are more highly functionalized polyols having 3 to 14 OH groups, in particular 4 to 9 OH groups. These polyols increase the crosslink density of the polymers and provide improved cohesion. They may comprise mixtures of polyols.

Examples of such polyols are sugar alcohols which comprise an appropriate number of OH groups, in particular tetritols, pentitols or hexitols or those based on disaccharides. The corresponding sugars may also be used, but it is in particular the hydrogenated sugar alcohols which are used. Examples are sorbitol, inositol, mannitol, threitol, erythritol, adonitol, arabitol, ribitol, xylitol, dulcitol, ribose, xylose, lyxose, glucose, galactose, mannose, allose, altrose, gulose, idose, talose, fructose, sorbose, psicose, tegatose, deoxyribose, glucosamine, galactosamine, rhamnose, digitoxose, sucrose, lactose, trehalose, maltose, cellobiose, melibiose, gentiobiose, rutinose. The corresponding ethoxylation and propoxylation products having up to 15 alkylene oxide units may also be used.

Likewise suitable are polyols having 4, 5 or 6 OH groups, which comprise at least one tertiary amino group. Examples of these are propoxylated or ethoxylated reaction products of $C_3$ to $C_6$ diamines or triamines. Ethoxylation and propoxylation products of ethylenediamine are in particular suitable.

The molecular weight of such more highly functionalized polyols may amount to 120 to 3000 g/mol, in particular 250 to 2000 g/mol.

Polyether polyols may also be used. Examples of these are reaction products of 3- to 6-functional alcohols which may be produced by reaction with ethylene oxide or propylene oxide, for example polypropylene glycols. A further group of suitable polyether polyols are polytetramethylene glycols which may for example be produced by acidic polymerization of tetrahydrofuran. The molecular weight of these polyether polyols is generally between 200 and 6000 g/mol, preferably in the range from 400 to 3000 g/mol.

Mixtures of different 3- to 14-functional polyols may also be used, with polyether polyols and sugar polyols in particular being suitable individually or as a mixture.

The more highly functional polyols generally bear OH groups. In another embodiment, however, it is also possible for at least a proportion of —SH or —NHR groups also to be present as reactive functional groups.

Due to the number of reactive OH or NH groups, the more highly functionalized polyols have a relatively high polarity. They are partially miscible with water. The quantity of the more highly functionalized and the hydrophobic polyols should be adjusted such that the mixture still exhibits hydrophobic properties. If such is not the case, processing to obtain a bubble-free adhesive is difficult and moreover the mechanical stability of a glue bond is not ensured at elevated atmospheric humidity.

A simple test for comparing hydrophobic properties involves combining the mixture of polyols with 1% water and mixing until homogeneous at 25° C. On addition of crude MDI in 1:1 quantity ratios and mixing, a sufficiently hydrophobic mixture crosslinks to yield a virtually bubble-free polymer, while a foam is obtained if the hydrophobic action is inadequate. An increase in volume of approx. 20% is already no longer suitable; no or only isolated bubbles should occur.

A further essential component of the two-component polyurethane adhesive according to the invention are polyester diols based on carboxylic acids with diols. Suitable polyester diols are those with a molecular weight of around 1000 to around 15,000 g/mol. Polyester polyols which are obtained by reacting low molecular weight alcohols with lactones may, for example, be used. Examples of alcohols are ethylene glycol, diethylene glycol, neopentyl glycol, hexanediol, butanediol, propylene glycol, glycerol, trimethylolpropane, 1,4-hydroxymethylcyclohexane, 2-methyl-1,3-propanediol, triethylene glycol, tetraethylene glycol, dipropylene glycol, dibutylene glycol and the polybutylene glycols, polyethylene glycols, polypropylene glycols with up to 10 repeat units.

Further suitable polyester polyols may be produced by polycondensation. Difunctional and/or small quantities of trifunctional alcohols may accordingly be condensed with a deficit of dicarboxylic acids and/or tricarboxylic acids or the reactive derivatives thereof to form polyester polyols. Aromatic or aliphatic carboxylic acids may be used. Suitable dicarboxylic acids are for example adipic acid or succinic acid and the higher homologs thereof with up to 16 C atoms, as are furthermore unsaturated dicarboxylic acids such as maleic acid or fumaric acid, aromatic dicarboxylic acids, in particular phthalic acid, isophthalic acid or terephthalic acid. Citric acid or trimellitic acid are, for example, suitable as tricarboxylic acids. The stated acids may be used individually or as mixtures of two or more thereof. Polyester polyols prepared from aliphatic carboxylic acids with aliphatic linear, branched or cycloaliphatic diols, for example prepared from the above-mentioned diols, are particularly suitable. Particularly suitable alcohols are hexanediol, ethylene glycol, diethylene glycol or neopentyl glycol or mixtures. Particularly suitable acids are those with 4 to 12 C atoms, such as succinic acid, azelaic acid, suberic acid, sebacic acid or adipic acid or mixtures thereof.

The polyester diols should have a low melting point or be liquid at room temperature. Molecular weight may preferably be between 1500 and 8000 g/mol. The polyols may have a functionality of approx. 1.8 to 2.2, in general they should be in diol form. The polyester diols are advantageous because they promote miscibility of the hydrophobic and polar polyols.

The polyol component should contain 2 to 30 wt. % of at least one polyester polyol, 5 to 50 wt. % of hydrophobic polyols and 5 to 35 wt. % of polyfunctional polyols with 3 to 14 OH groups, and 2 to 65 wt. % of additives or auxiliary substances. A preferred embodiment should contain 5 to 20 wt. % of polyester polyols, 10 to 30 wt. % of hydrophobic polyols, 10 to 30 wt. % of polyfunctional polyols together with additives. The total of the percentages of the polyol component should here amount to 100%.

The various polyol components have an influence on the necessary properties of the crosslinked adhesive. If the quantity of polyols with 3 to 14 OH groups is too low, sufficient cohesion of the adhesive is not obtained. The quantity of these polyols may have an influence on the crosslink density of the adhesive; it furthermore has an influence on the glass transition temperature. If the quantity of the hydrophobic polyols is not sufficient, mechanical defects, such as gas bubbles, may be caused on gluing. There may also be a negative impact on the open time necessary for processing.

Polyfunctional isocyanates are suitable as the polyisocyanates in the isocyanate component. Suitable isocyanates preferably contain on average 2 to 5, preferably up to 4 NCO groups. Suitable isocyanates are 1,5-naphthylene diisocyanate, 2,4- or 4,4'-diphenylmethane diisocyanate (MDI), hydrogenated MDI (H12MDI), xylylene diisocyanate (XDI), m- and p-tetramethylxylylene diisocyanate (TMXDI), 4,4'-diphenyldimethylmethane diisocyanate, di- and tetraalkyl-diphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,12-diisocyanato-dodecane, 1,6-diisocyanato-2,2,4-trimethyl hexane, 1,6-diisocyanato-2,4,4-trimethylhexane, 1-isocyanatomethyl-3-isocyanato-1,5,5-trimethylcyclohexane (IPDI), tetramethoxybutane 1,4-diisocyanate, butane 1,4-diisocyanate, hexane 1,6-diisocyanate (HDI), dimer fatty acid diisocyanate, dicyclohexylmethane diisocyanate, cyclohexane 1,4-diisocyanate, ethylene diisocyanate or phthalic acid bis-isocyanato-ethyl ester.

It is also possible to use low molecular prepolymers, namely oligomers with a plurality of isocyanate groups, i.e. reaction products of MDI or TDI with low molecular weight diols, such as for example ethylene glycol, diethylene glycol, propylene glycol, dipropylene glycol or triethylene glycol. These oligomers are obtained in the event of an excess of monomeric polyisocyanate in the presence of diols. The molecular weight of the dials is here generally below 1500 g/mol. Monomers may optionally be eliminated from the reaction product by distillation. Isocyanurates and biurets of isocyanates, for example of HDI or IPDI, are also suitable, as are carbodiimide-liquefied diphenylmethane diisocyanate or crude MDI.

Aliphatic and cycloaliphatic polyisocyanates may be used; their reactivity may be increased by elevated temperatures or catalysts. Aromatic polyisocyanates are, however, preferably preferred, as are oligomerized NCO-terminal adducts prepared from the above-stated aromatic isocyanates and low molecular weight dials. The polyisocyanates should preferably be flowable at room temperature.

The two-component polyurethane adhesives according to the invention may additionally contain auxiliary materials, which are preferably admixed wholly or partially with the polyol component. These are taken to mean substances which are generally added in small quantities in order to modify the properties of the adhesive in a desired direction, for example viscosity, wetting behavior, stability, rate of reaction, bubble formation, storage life or adhesion, and also to adjust service characteristics to the intended application. Examples of auxiliary substances are fillers, leveling agents, deaerating agents, thixotroping agents, catalysts, antioxidants, dyes, desiccants, resins, plasticizers and wetting agents.

Catalysts may also be used, for example when using aliphatic isocyanates. Catalysts which are used are the conventional organometallic compounds known in polyurethane chemistry, such as for example iron compounds or also in particular tin compounds. Examples of these are 1,3-dicarbonyl compounds of iron, such as iron(III) acetylacetonate, and in particular the organotin compounds of di- or tetravalent tin, in particular Sn(II) carboxylates or dialkyl-Sn(IV) dicarboxylates or the corresponding dialkoxylates, such as for example dibutyltin dilaurate, dibutyltin diacetate, dioctyltin diacetate, dibutyltin maleate, tin(II) octoate. In particular, tertiary amines or amidines may be used as catalysts, optionally in combination with the above-stated tin compounds. Amines which may here be considered are both acyclic and in particular cyclic compounds. Examples are tetramethylbutanediamine, bis(dimethylaminoethanol) ether, 1,4-diazabicyclooctane (DABCO), 1,8-diazabicyclo-(5.4.0)-undecene, 2,2'-dimorpholinodiethyl ether, dimethylpiperazine or mixtures of the above-stated amines. Another preferred embodiment of the two-component polyurethane adhesive according to the invention proceeds without catalysts.

The adhesive according to the invention may furthermore optionally contain additional stabilizers. "Stabilizers" should be understood for the purposes of the present invention to mean antioxidants, UV stabilizers or hydrolysis stabilizers. Examples of these are the conventional commercial sterically hindered phenols and/or thioethers and/or substituted benzotriazoles and/or amines of the "HALS" (Hindered Amine Light Stabilizer) type.

Resins may furthermore optionally be present. These may comprise natural resins or synthetic resins. Examples of these are shellac, rosin, tall oil resins, gum resins or wood resins, hydrocarbon, terpene, coumarone/indene, furan, alkyd, glycerol ester, urea, melamine, polyamide resins, in particular also aldehyde, ketone or phenolic resins. The resins generally have a low melting point and are advantageous among other things for improved compatibility of the components. One particular embodiment uses resins containing OH groups, in particular a plurality of OH groups. These may then also react with the isocyanates. In a preferred embodiment, the quantity may amount to between 5 and 30 wt. %.

The compositions according to the invention may moreover contain still further, per se known auxiliary substances and additives, such as for example plasticizers, thixotroping agents, coloring pastes or pigments. Suitable fillers are inorganic compounds which are not reactive towards isocyanates. Examples of suitable fillers and pigments are natural, ground chalk, precipitated chalk, barytes, talcum, mica, carbon black, titanium dioxide, iron oxides, aluminum oxide, zinc oxide, zinc sulfate or silicon dioxide. Water-absorbing powders, for example zeolite, may also be present as a filler. The fillers should be present in finely divided form, for example of 1 to 200 µm, in particular up to 50 µm, in size, but they may also be nanoscale pigments. The quantity of the fillers and pigments should amount to from 0 to 60 wt. %, in particular from 5 to 40 wt. %. The quantity of fillers has an influence on the hardness of the crosslinked adhesive. Viscosity may also be influenced by the quantity and selection of the filler.

The additives are selected such that do not enter into any reactions or secondary reactions with isocyanates, at least not over the duration of the crosslinking reaction. In particular, no additives, for example carboxylic acids, which promote the formation of bubbles in the adhesive should be added. The adhesive according to the invention should furthermore preferably contain no organic solvents which are for example volatile at temperatures of up to 120° C. Plasticizers should also in particular not be present.

The ratio of the isocyanate groups present in the isocyanate component to the OH groups present in the polyol is generally in the range of equivalence, it being convenient to provide a slight excess of isocyanate groups with regard to moisture present on the surface. The NCO/OH ratio should amount to between 0.90:1 and 1.5:1, in particular 1.0:1 to 1.3:1.

The two-component polyurethane adhesive according to the invention is produced by firstly producing the polyol component. To this end, the liquid polyols may be mixed, then any solid fractions in the mixture should be dissolved. This may also be assisted by heating. The auxiliary materials are then admixed and dispersed. The moisture content should here be kept low, for example the quantity of water may be reduced by using molecular sieves. Some of the inert auxiliary substances may also be mixed into the isocyanate component. The two components are stored separately until use. For use, these two components are mixed together in a manner known per se and the mixture is applied to the substrates to be glued.

The adhesive according to the invention should assume a liquid to pasty form at application temperature, i.e. between 10 and 40° C. It should be applicable as a film or bead and, on application, should not run on the substrate. The adhesive mixture according to the invention is in particular thixotropic.

Since large areas often have to be glued and in order to allow accurate alignment of the substrate parts to be glued, a long open time is necessary. According to the invention, an open time of more than 30 min, in particular of above 60 min, is achieved. Open time is taken to mean the period of time which, once the two-component adhesive has been completely mixed, remains for proper processing before the consistency of the adhesive has changed due to the onset of the reaction to such an extent that application, flow out on the substrate and good adhesion may no longer be achieved. The change in the adhesive composition may here be due to the intended crosslinking reactions, but secondary reactions may also have a negative impact on pot life.

The long open time may be influenced by the quantity of the hydrophobic alcohols. If the quantity of hydrophobic polyols is too low, an adequate open time is not obtained. The adhesive crosslinks rapidly and bubbles are observed to form. The catalyst may also influence the rate of reaction and open time. The water content of the polyol component should amount to less than 2 wt. %, in particular less than 1 wt. %, preferably less than 0.5 wt. %.

By selection of the components it is achieved that the adhesive presents a glass transition temperature ($T_g$) of 50° C. to 130° C., in particular of 60 to 110° C. (measured by DSC, DIN 11357). The elevated $T_g$ is necessary in order to obtain the required mechanical stability. Elevated mechanical stability of the crosslinked adhesives is obtained thanks to the selection according to the invention of hydrophobic polyols and the polyfunctional polyol. The adhesives suitable according to the invention yield a hydrophobic network after crosslinking. It is found in this connection that an inadequate quantity of the hydrophobic alcohols results in an inconstant $T_g$ on exposure to moisture. According to the invention, after immersion of a test specimen in water (1000 h, distilled water, 25° C.), the glass transition temperature should deviate by at most 20% from the initial value.

In a further embodiment, it is possible for the adhesive to comprise at least two glass transition temperatures. The second glass transition temperature should here be below the first glass transition temperature. This second $T_g$ may for example be in a temperature range from −50° C. to +70° C., in particular from −10° C. to +40° C.

The structural stability of the glue bond may, for example, be measured by means of the modulus of elasticity. At a measurement temperature of from −10° C. to +70° C., this should be greater than 1000 MPa (similar to DIN EN ISO 527).

The two-component polyurethane adhesive according to the invention may in particular be used for gluing fiber composite materials. The substrates are here produced as a molded part. The surface to be glued should here be free of contaminants; it may be used directly from the production process. Provisional protection of such surfaces by a protective woven fabric, which is then removed before further processing, is also conventional. The adhesive according to the invention is applied onto this surface in the form of a layer, bead or spots. Layer thickness may be up to 2 cm. The further substrate is then applied, aligned and optionally pressed and fixed. As this happens, the still flowable adhesive is distributed uniformly over the substrate surface. Thanks to the elevated layer thickness, it is possible to ensure that unevennesses of the surfaces to be glued are leveled out with adhesive and the substrates come into extensive contact.

The glue bond is then cured. This may proceed at ambient temperature; crosslinking may optionally also be accelerated by elevated temperatures of up to 90° C. After crosslinking, the adhesive according to the invention exhibits elevated mechanical strength. A glue bond exhibits a shear strength of above MPa measured to DIN EN 1465.

In order to improve a glue bond, it may be advantageous, once the adhesive has crosslinked, to subject the glued substrates to a heat treatment process. The adhesive bond should here be adjusted to an elevated temperature of between 40 and 100° C. for a period of between 30 min and 24 hours. Without being tied to a particular theory, it is assumed that this gives rises to internal ordering of the crosslink sites and crystalline domains, so resulting in stable service characteristics. Use of the two-component polyurethane adhesives according to the invention here permits a reduction in crosslinking time or in the temperature required. The loads to which the composite materials are exposed during the manufacturing process are also reduced as a consequence. Heat treatment may likewise be limited or avoided.

Once cured, the adhesives according to the invention are mechanically stable even at elevated temperatures. In this way, gaps, crevices or cavities of up to 2 mm in size may be filled with the adhesive and give rise to a strong glue bond. The glue bond is also stable on exposure to fluctuating loads, as arise when the blade is used as a rotor. The vibrations, changes in temperature or elevated exposure to moisture brought about by various environmental influences do not weaken the glue bond.

The following Examples illustrate the invention.

Polyester polyol A: molecular weight=2000; prepared from adipic acid reacted with butanediol and hexanediol; f=2
Hydrophobic polyol: castor oil
Polyol B1: molecular weight=700; polyether polyol; f=3
Polyol B2: N,N,N'N'"-tetra(2-hydroxypropyl)ethylenediamine; f=4

The constituents of the polyol component (quantity by weight) are mixed at room temperature. The adhesive is produced by mixing the polyol component with the isocyanate; within 30 minutes suitable test specimens are produced and then cured.

Curing: 48 h at 40° C.

| Starting material | Example | |
|---|---|---|
| | 1 | 2 |
| Polyol component | | |
| Castor oil | 30 | 30 |
| Polyol B1 | 25 | ./. |
| Polyol B2 | ./. | 10 |
| Polyester polyol A | 13 | 14 |
| Calcium carbonate | 20 | 20 |
| Aerosil R 202 | 5 | 4 |
| DABCO | 0.5 | 0.5 |
| Stabilizers | 0.5 | 0.5 |
| Zeolites | 5.0 | 2.0 |

| Starting material | Example | |
|---|---|---|
| | 1 | 2 |
| Isocyanate component | | |
| Crude MDI | NCO:OH 1.05 | NCO:OH 1.05 |
| Modulus of elasticity (approx.) | 2000 MPa | 2200 MPa |
| $T_g$ | 55° C. | 60° C. |
| $T_g$ (after immersion in water) | approx. 45° C. | approx. 50° C. |

A layer of the polyol component is mixed with 1% water, then mixed with the same quantity of MDI and cured at room temperature as a body approx. 1 cm thick, 5 cm in diameter. A solid body containing only few bubbles is obtained.

Example 3

Comparison

A composition according to Example 1 was produced, with the provision that castor oil (hydrophobic polyol) was replaced by a corresponding quantity of a polyethylene glycol (molecular weight approx. 1000, 3-functional). The quantity of zeolite was reduced to 1.

On curing, it was found that a thick adhesive bead exhibited bubbles and was consequently not mechanically stable.
A mixture of the polyol components with 1% water and with the same quantity of isocyanate likewise hardened with vigorous bubble formation.

Example 4

Comparison

A mixture according to Example 2 is produced. Polyol B is replaced by a polyether diol (molecular weight 800).

The adhesive cures. It is found, however, that the glass transition temperature exhibits a value of below 40° C. The mechanical properties of the adhesive (for example modulus of elasticity) were inadequate.

The invention claimed is:

1. A two-component polyurethane adhesive consisting of a polyol component containing
    a) 2 to 30 wt. % of at least one polyester diol with a molecular weight of above 1000 g/mol,
    b) 5 to 35 wt. % of at least one 3- to 14-functional polyol
    c) 5 to 35 wt. % of hydrophobic polyols,
    d) 2 to 65 wt. % of further additives or auxiliary substances, the total being intended to amount to 100%,
    together with an isocyanate component prepared from polyisocyanates in an NCO/OH ratio of 0.9:1 to 1.5:1, the crosslinked adhesive exhibiting a $T_g$ of above 50° C.

2. The two-component polyurethane adhesive according to claim 1, wherein the hydrophobic polyol c) exhibits a functionality of between 2.3 and 4 and is selected from polycarbonates, polybutadienes or oleochemical polyols.

3. The two-component polyurethane adhesive according to claim 1, wherein the polyester diol is synthesized from low molecular weight linear aliphatic, cycloaliphatic and/or branched dials and aliphatic dicarboxylic acids, with a molecular weight of 1500 g/mol to 15000 g/mol.

4. The two-component polyurethane adhesive according to claim 1, wherein the polyol b) is a polyol comprising 3- to 9-OH groups and is selected from sugar alcohols, polyether polyols or polyols containing amino groups.

5. The two-component polyurethane adhesive according to claim 1, wherein the additives include resins comprising one or more OH groups.

6. The two-component polyurethane adhesive according to claim 1, wherein aromatic polyisocyanates are used.

7. The two-component polyurethane adhesive according to claim 1, wherein the adhesive contains no solvents and/or no plasticizers.

8. Crosslinked reaction products of the two-component polyurethane adhesive according to claim 1, wherein the crosslinked reaction products exhibit a first $T_g$ of above 60° C. and below 130° C.

9. The crosslinked reaction products according to claim 8, wherein the crosslinked reaction products exhibit hydrophobic properties such that, after immersion in water, the glass transition temperature $T_g$ deviates by less than 20% from the first $T_g$ value.

10. The crosslinked reaction products according to claim 8, wherein the crosslinked reaction products exhibit a second $T_g$ which is below the first $T_g$.

11. The crosslinked reaction products according to claim 8, wherein, after crosslinking, the reaction products exhibit a modulus of elasticity of greater than 1000 MPa at a temperature of between −10° C. and 70° C.

12. A portion of the two-component polyurethane adhesive according to claim 1 disposed between two aligned substrates each independently selected from metal, plastic, foam or fiber composite materials.

13. A portion of the two-component polyurethane adhesive according to claim 1 disposed between two aligned molded parts, wherein the molded parts comprise glass fibers, carbon fibers and/or textile fibers in a cured polyester or polyepoxy matrix.

* * * * *